US012628023B2

(12) United States Patent
Xue et al.

(10) Patent No.: US 12,628,023 B2
(45) Date of Patent: May 12, 2026

(54) METHODS, DEVICES, AND SYSTEMS FOR CONFIGURING UE WITH QUALITY INDICATION FOR MINIMIZATION OF DRIVE TEST

(71) Applicant: ZTE Corporation, Shenzhen (CN)

(72) Inventors: Yan Xue, Shenzhen (CN); Feng Xie, Shenzhen (CN); Li Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 393 days.

(21) Appl. No.: 18/487,243

(22) Filed: Oct. 16, 2023

(65) Prior Publication Data

US 2024/0056866 A1 Feb. 15, 2024

Related U.S. Application Data

(63) Continuation of application No. PCT/CN2021/093279, filed on May 12, 2021.

(51) Int. Cl.
*H04W 24/10* (2009.01)

(52) U.S. Cl.
CPC .................................. *H04W 24/10* (2013.01)

(58) Field of Classification Search
CPC ...................................................... H04W 24/10
See application file for complete search history.

(56) References Cited

U.S. PATENT DOCUMENTS

2011/0201279 A1 8/2011 Suzuki et al.
2020/0351693 A1* 11/2020 Jung ..................... H04W 24/08

FOREIGN PATENT DOCUMENTS

| CN | 102892129 A | 1/2013 |
|---|---|---|
| CN | 103167533 A | 6/2013 |
| CN | 103369558 A | 10/2013 |
| CN | 103517312 A | 1/2014 |
| WO | WO 2017084713 A1 | 5/2017 |
| WO | WO 2020067812 A1 | 4/2020 |

OTHER PUBLICATIONS

Extended European Search Report regarding Application No. EP 21 94 1305 dated May 6, 2024, 10 pages.
International Search Report and Written Opinion regarding PCT/CN2021/093279 dated Feb. 16, 2022.

* cited by examiner

*Primary Examiner* — Chuong A Ngo
(74) *Attorney, Agent, or Firm* — Crowell & Moring LLP

(57) ABSTRACT
The present disclosure describes methods, system, and devices for configuring a user equipment (UE) with quality information for minimization of drive test (MDT). One method includes sending, by the RAN node, a configuration message to the UE, the configuration message comprising the quality information, so that the UE performs an MDT task and reports at least one MDT measurement result according to the quality information; and receiving, by the RAN node, the at least one MDT measurement result from the UE. Another method includes receiving, by the UE, a configuration message from a RAN node, the configuration message comprising the quality information; and performing, by the UE, an MDT task and reporting at least one MDT measurement result according to the quality information.

20 Claims, 7 Drawing Sheets

400 sending, by the RAN node, a configuration message to the UE, the configuration message comprising the quality information, so that the UE performs a MDT task and reports at least one MDT measurement result according to the quality information;

410 receiving, by the RAN node, the at least one MDT measurement result from the UE

500 receiving, by the UE, a configuration message from a radio access network (RAN) node, the configuration message comprising the quality information;

510 performing, by the UE, a MDT task and reporting at least one MDT measurement result according to the quality information

600 sending, by the CN, a start message to a radio access network (RAN) node, the start message comprising the quality information, wherein: in response to receiving the start message, the RAN node sends a configuration message to the UE, the configuration message comprising the quality information, so that the UE performs a MDT task and reports a MDT measurement result according to the quality information

METHODS, DEVICES, AND SYSTEMS FOR CONFIGURING UE WITH QUALITY INDICATION FOR MINIMIZATION OF DRIVE TEST

CROSS-REFERENCE TO RELATED APPLICATION

This application is a continuation application of PCT International Patent Application No. PCT/CN2021/093279, filed with the China National Intellectual Property Administration, PRC on May 12, 2021, which is herein incorporated by reference in its entirety.

TECHNICAL FIELD

The present disclosure is directed generally to wireless communications. Particularly, the present disclosure relates to methods, devices, and systems for configuring a user equipment (UE) with quality indication for minimization of drive test (MDT).

BACKGROUND

Wireless communication technologies are moving the world toward an increasingly connected and networked society. In some previous generation of wireless communications, manual driving test has been used to perform various kinds of driving test against various network associated objects and quantities. This manual driving test is time consuming and costly. In recent developing generations of wireless communications, minimization of drive test (MDT) emerges to replace manual driving test to perform various kinds of driving test of MDT tasks against various network associated objects and quantities and to collect MDT measurement results.

However, there are various problems/issues associated with the present MDT framework. For example but not limited to, one problem/issue may be that the present MDT mechanism framework may not meet a specific quality requirement for a particular MDT task.

The present disclosure describes various embodiments for configuring a user equipment (UE) with quality indication for minimization of drive test (MDT), addressing at least one of the problems/issues discussed above. The present disclosure may enhance MDT mechanism and configuration of selecting and configuring UE with various MDT tasks, improving a technology field in the wireless communication.

SUMMARY

This document relates to methods, systems, and devices for wireless communication, and more specifically, for configuring a user equipment (UE) with quality indication for minimization of drive test (MDT).

In one embodiment, the present disclosure describes a method for wireless communication. The method includes configuring, by a radio access network (RAN) node, a user equipment (UE) with quality information for minimization of drive test (MDT) by: sending, by the RAN node, a configuration message to the UE, the configuration message comprising the quality information, so that the UE performs an MDT task and reports at least one MDT measurement result according to the quality information; and receiving, by the RAN node, the at least one MDT measurement result from the UE.

In another embodiment, the present disclosure describes a method for wireless communication. The method includes configuring a user equipment (UE) with quality information for minimization of drive test (MDT) by: receiving, by the UE, a configuration message from a radio access network (RAN) node, the configuration message comprising the quality information; and performing, by the UE, an MDT task and reporting at least one MDT measurement result according to the quality information.

In another embodiment, the present disclosure describes a method for wireless communication. The method includes configuring, by a core network (CN), a user equipment (UE) with quality information for minimization of drive test (MDT) by: sending, by the CN, a start message to a radio access network (RAN) node, the start message comprising the quality information, wherein: in response to receiving the start message, the RAN node sends a configuration message to the UE, the configuration message comprising the quality information, so that the UE performs an MDT task and reports an MDT measurement result according to the quality information.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4 shows a flow diagram of a method for wireless communication.

FIG. 5 shows a flow diagram of a method for wireless communication.

FIG. 6 shows a flow diagram of a method for wireless communication.

DETAILED DESCRIPTION

Figure 1A:
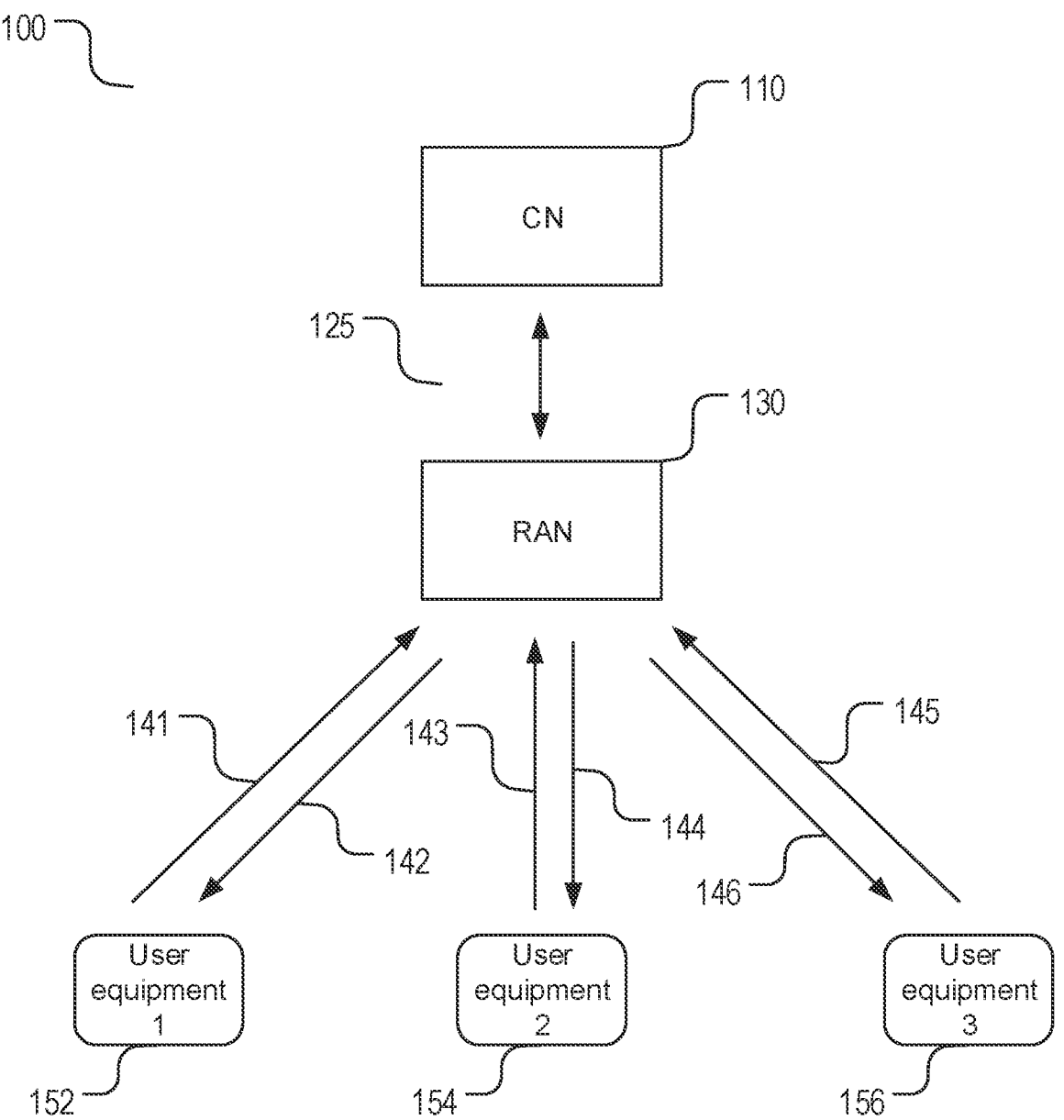
FIG. 1A shows an example of a wireless communication system include a core network, a wireless network node, and one or more user equipment.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes various methods and devices for configuring a user equipment (UE) with quality indication for minimization of drive test (MDT).

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfill the requirements from different industries and users.

FIG. 1A shows a wireless communication system 100 including a core network (CN) 110, a wireless node 130, and one or more user equipment (UE) (152, 154, and 156). The wireless node 130 may include a wireless network base station, a radio access network (RAN) node, or a NG radio access network (NG-RAN) base station or node, which may include a nodeB (NB, e.g., a gNB) in a mobile telecommunications context. In one implementation, the core network 110 may include a 5G core network (5GC or 5GCN), and the interface 125 may include a NG interface. The wireless node 130 (e.g, RAN) may include an architecture of separating a central unit (CU) and one or more distributed units (DUs).

The communication between the RAN and the one or more UE may include at least one radio bearer (RB) or channel (RB/channel). Referring to FIG. 1A, a first UE 152 may wirelessly receive from the RAN 130 via a downlink RB/channel 142 and wirelessly send communication to the RAN 130 via a uplink RB/channel 141. Likewise, a second UE 154 may wirelessly receive communicate from the RAN 130 via a downlink RB/channel 144 and wirelessly send communication to the RAN 130 via a uplink RB/channel 143; and a third UE 156 may wirelessly receive communicate from the RAN 130 via a downlink RB/channel 146 and wirelessly send communication to the RAN 130 via a uplink RB/channel 145.

In some previous generation of wireless communications, manual driving test has been used to perform various kinds of driving test against various network associated objects and quantities. This manual driving test is time consuming and costly. In recent developing generations of wireless communications, minimization of drive test (MDT) emerges to replace manual driving test to perform various kinds of driving test of MDT tasks against various network associated objects and quantities and to collect MDT measurement results.

With the latest development of MDT techniques in 3GPP industry field, the NW may select and configure one or more proper UE to perform various kinds of driving test of MDT tasks against various NW associated objects and/or quantities. The NW may collect and retrieve MDT measurement results (e.g., MDT logs) from the one or more participating UE. The NW may optimize itself in various performance aspects, such as radio coverage, radio capacity, service parameter setting, and/or, etc.

However, there are various problems/issues associated with the present MDT framework. For example but not limited to, one problem/issue may be that, in the present MDT mechanism framework, there may be little quality requirements in MDT task configuration. Another problem/issue may be that, the NW may receive an overtime report, coarse information, or may not receive report correctly for an MDT task. Particularly when an MDT task is a time-sensitive task, it may be more important to improve the successful rate of transmitting a report to the time-sensitive MDT task.

When there is no quality requirements such as precision, reliability, and purpose, the effect of MDT task may not meet the real intention for the sake of unsuitable MDT result.

The present disclosure describes various embodiments for configuring a user equipment (UE) with quality indication for minimization of drive test (MDT), addressing at least one of the problems/issues discussed above. The present disclosure may also provide more benefits when the NW is able to configure quality requirements in MDT task to get the expected MDT measurement results, so as to enhance MDT mechanism and configuration of selecting and configuring UE with various MDT tasks, thus improving a technology field in the wireless communication.

Figure 1B:
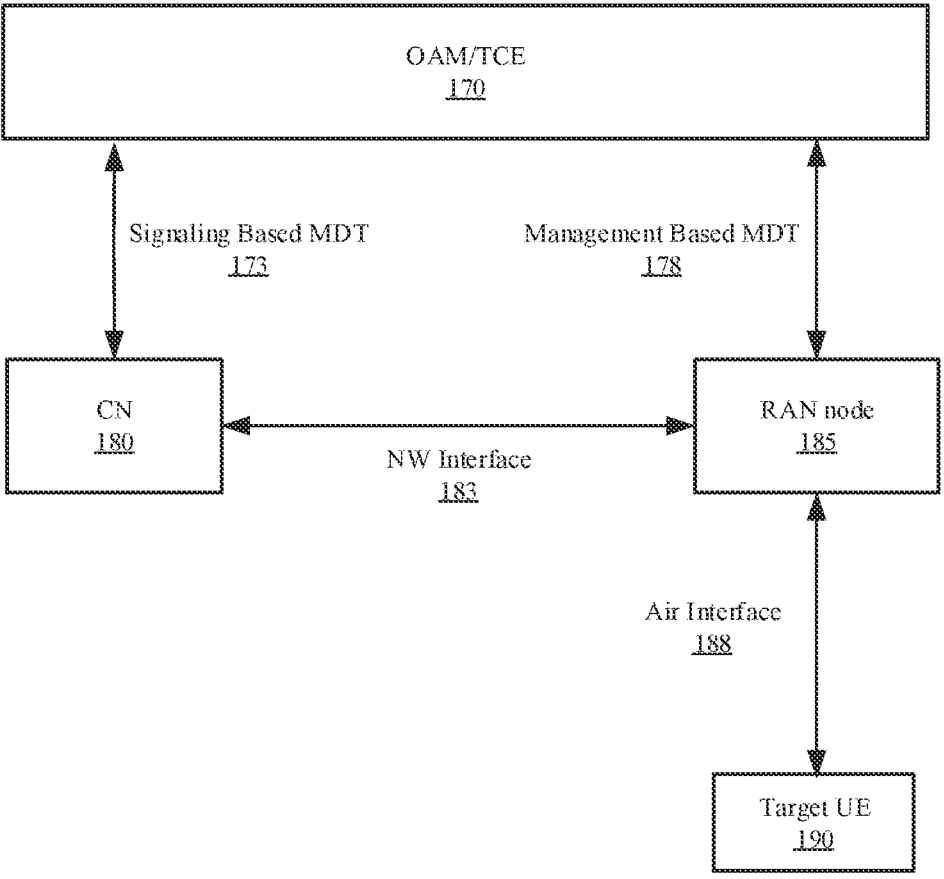
FIG. 1B shows a schematic diagram of configuring a user equipment (UE) for minimization of drive test (MDT).

FIG. 1B shows a schematic diagram for a NW to select and configure a proper UE for expected MDT tasks. The NW may include a CN 180 and/or a RAN node 185. The CN 180 and/or the RAN node 185 may communicate with an operation and maintenance (OAM) including a trace collection entity (TCE) 170 via for a signaling based MDT 173 and/or a management based MDT 178, respectively. The CN 180 may communicate with the RAN node 185 via a NW interface 183. The RAN node 185 may communicate with a target UE 190 via an air interface 188.

In the classic cellular mobile systems such as 4G Long Term Evolution-Advanced (LTE-A) and 5G New Radio (NR), the MDT feature may be implemented to replace or supplement the legacy costly manual driving test. The LTE-A system may introduce a series of (enhanced) MDT features, and the NR system may introduce a series of (enhanced) MDT features. For both LTE-A and NR systems, the NW (e.g., CN or RAN) may select and configure one or more proper target UE(s) to perform various kinds of MDT tasks against various NW associated objects and/or quantities. The NW may collect and retrieve MDT measurement results from those UEs via signaling radio bearer (SRB) in the air, and may further upload the MDT measurement results (e.g., MDT logs) onto up streamed TCE in the OAM. Based on those MDT measurement results and logs, the NW may analyze and figure out various NW problems and defects so that the NW may further optimize itself in many performance aspects, such as radio coverage, radio capacity, service parameter settings, etc.

The TCE in OAM 170 may trigger and initiate one or more MDT tasks towards the CN 180 firstly, and then the CN may trigger and initiate the MDT tasks towards a certain RAN node to communicate with a specific target UE. The RAN node 185 may configure the target UE 190 with the one or more particular MDT tasks via SRB in the air. In one implementation, the above procedure may be called signaling based MDT.

In another implementation, the TCE in OAM 170 may trigger and initiate one or more MDT tasks towards a certain RAN node directly but without indicating specific target UE, and then the RAN node may locally select, for example, based on management based MDT PLMN list from user consent information, and may configure a particular target UE with one or more particular MDT tasks via SRB in the air. The above procedure may be called management based MDT. Optionally, in some implementations above, it may be always the NW (CN or RAN) to select the proper UE(s) for expected MDT tasks.

Figure 2:
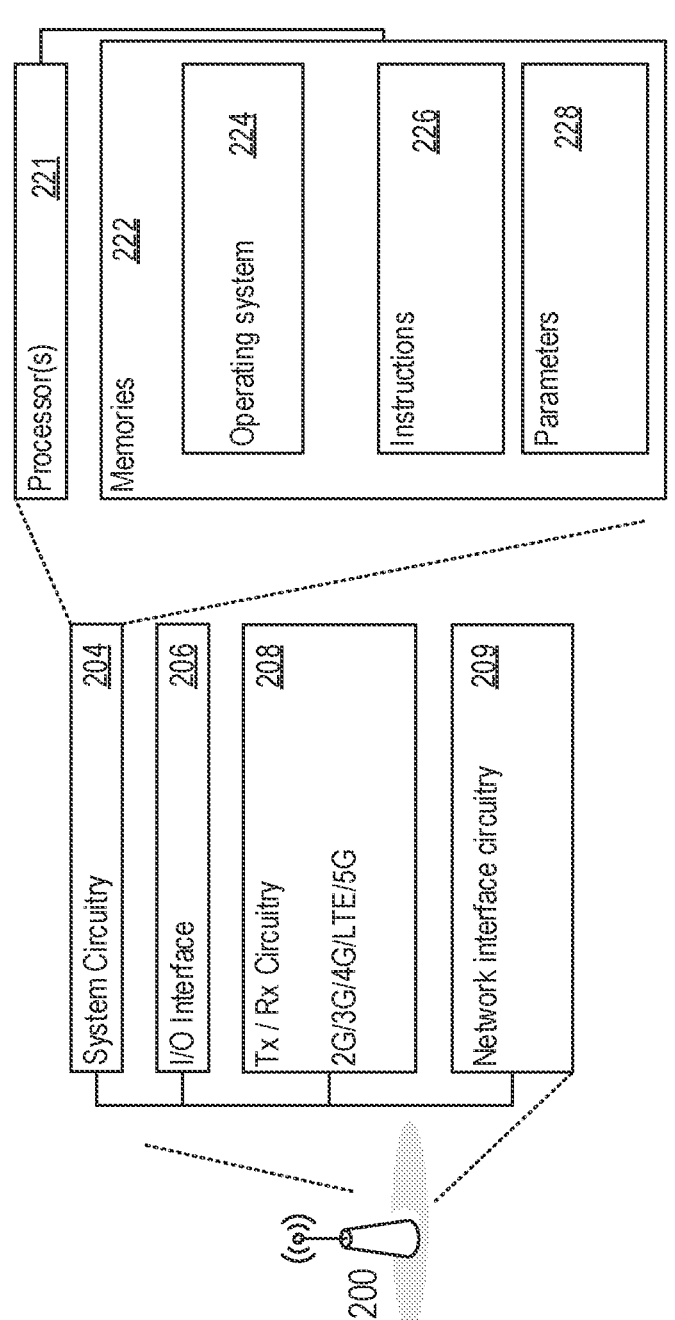
FIG. 2 shows an example of a wireless network node.

FIG. 2 shows an example of electronic device 200 to implement a network base station (e.g., a radio access network node), a core network (CN), and/or an operation and maintenance (OAM). Optionally in one implementation, the example electronic device 200 may include radio transmitting/receiving (Tx/Rx) circuitry 208 to transmit/receive communication with UEs and/or other base stations. Optionally in one implementation, the electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 221 to perform the functions of the network node. The parameters 228 may include parameters to support execution of the instructions 226. For example, parameters may include network protocol settings, bandwidth parameters, radio frequency mapping assignments, and/or other parameters.

Figure 3:
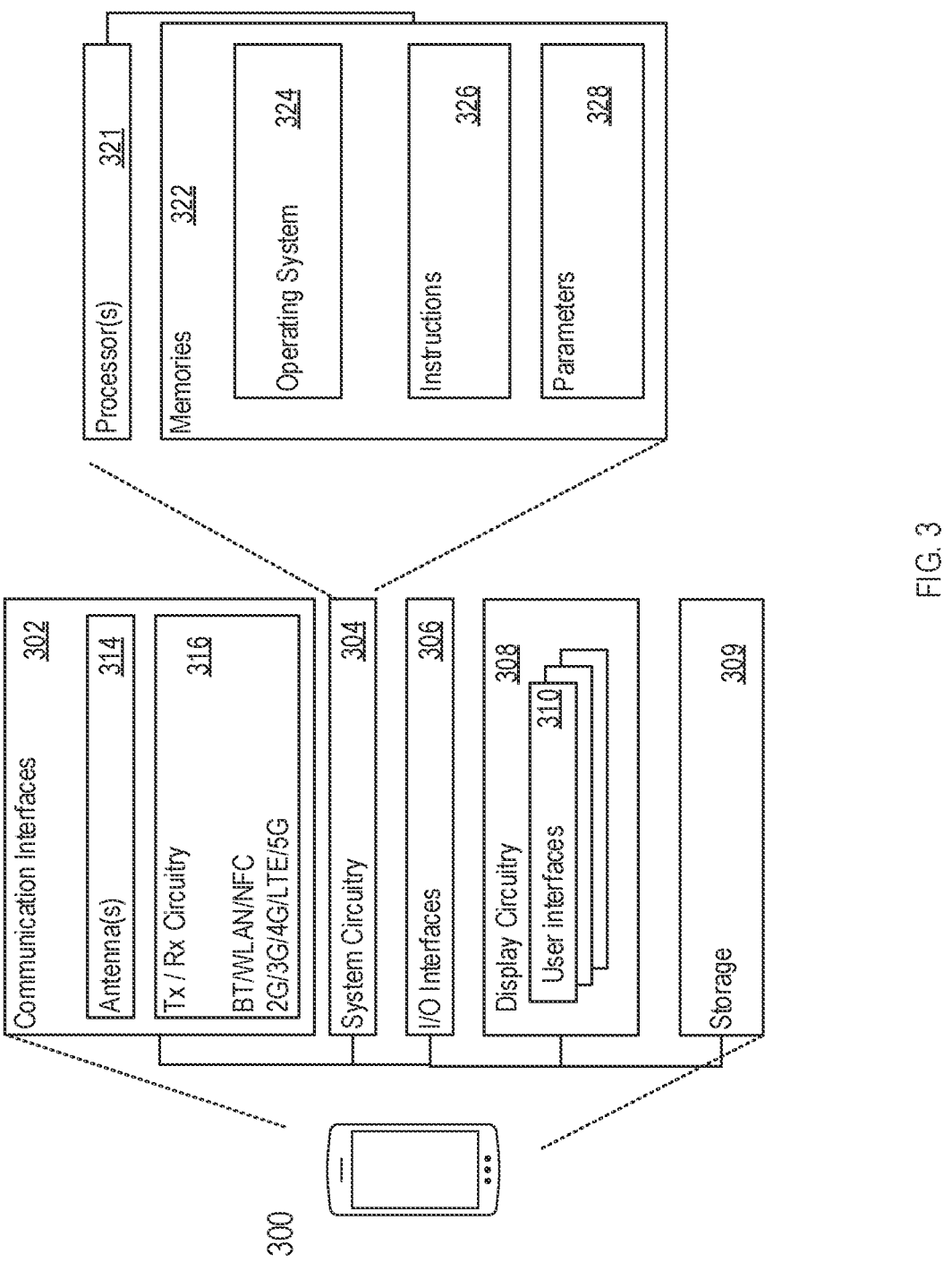
FIG. 3 shows an example of a user equipment.

FIG. 3 shows an example of an electronic device to implement a terminal device 300 (for example, a user equipment (UE)). The UE 300 may be a mobile device, for example, a smart phone or a mobile communication module disposed in a vehicle. The UE 300 may include a portion or all of the following: communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes various embodiments for configuring a user equipment (UE) with quality indication for minimization of drive test (MDT), which may be implemented, partly or totally, on one or more electronic device 200 and/or one or more terminal device 300 described above in FIGS. 2-3.

In the present disclosure, one or more framework and procedure for signaling based MDT and management based MDT may be inherited and reused partially or in its entirety as much as possible. For a portion or all existing MDT configuration information may include, for example but not limited to, an information element (IE) "MDT Configuration-NR" and/or "MDT Configuration-EUTRA", and potentially new MDT configuration information, a NW, which may include a CN and/or a RAN, may provide and/or configure new MDT configuration information to a UE, so that the UE may perform the MDT tasks as expected by the NW.

Figure 4:
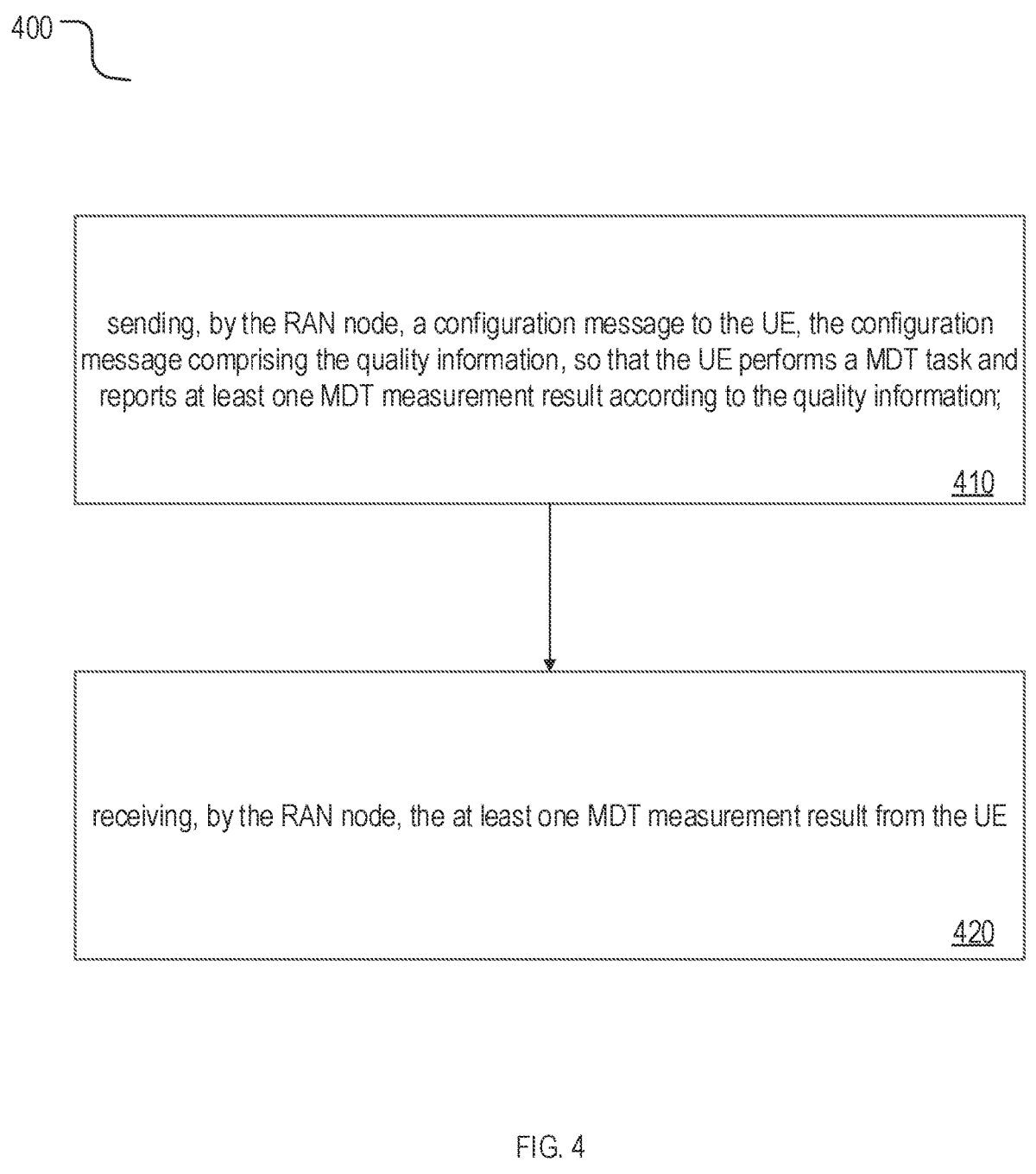

In one embodiment, referring to FIG. 4, a method 400 for wireless communication includes configuring, by a radio access network (RAN) node, a user equipment (UE) with quality information for minimization of drive test (MDT). The method 400 may include a portion or all of the following steps: step 410, sending, by the RAN node, a configuration message to the UE, the configuration message comprising the quality information, so that the UE performs an MDT task and reports at least one MDT measurement result according to the quality information; and/or step 420, receiving, by the RAN node, the at least one MDT measurement result from the UE.

Figures 5, 6:
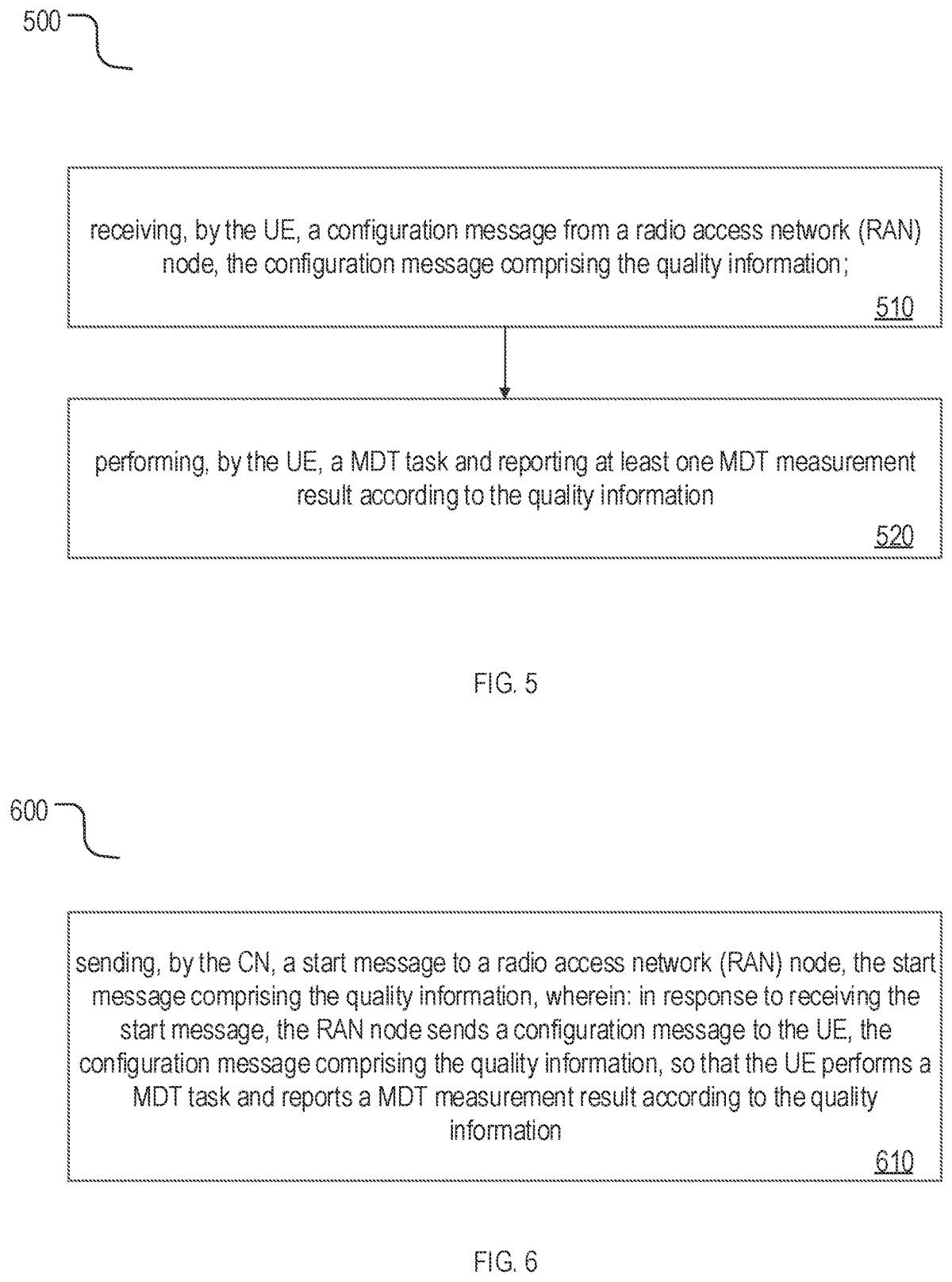

In another embodiment, referring to FIG. 5, a method 500 for wireless communication includes configuring a user equipment (UE) with quality information for minimization of drive test (MDT). The method 500 may include a portion or all of the following steps: step 510, receiving, by the UE, a configuration message from a radio access network (RAN) node, the configuration message comprising the quality information; and/or step 520, performing, by the UE, an MDT task and reporting at least one MDT measurement result according to the quality information.

In another embodiment, referring to FIG. 6, a method 600 for wireless communication includes configuring, by a core network (CN), a user equipment (UE) with quality information for minimization of drive test (MDT). The method 600 may include step 610, sending, by the CN, a start message to a radio access network (RAN) node, the start message comprising the quality information, wherein: in response to receiving the start message, the RAN node sends a configuration message to the UE, the configuration message comprising the quality information, so that the UE performs an MDT task and reports an MDT measurement result according to the quality information. In one implementation, the start message may include a NGAP:TRACE START message.

In one implementation, the quality information comprises at least one of precision information; reliability information; intention information; or data-processing information.

In another implementation, the start message comprises non-access stratum (NAS) information; and the configuration message comprises the NAS information.

In another implementation, the start message is transmitted via a NAS procedure so that the quality information is transparent to the RAN node.

In another implementation, the start message is transmitted via an access stratum (AS) procedure; and in response to receiving the start message, the RAN node compiles and sends the configuration message to the UE.

In another implementation, the RAN node compiles and sends a radio resource control (RRC) message to the UE, the RRC message comprising the configuration message for the UE.

In another implementation, the quality information may indicate where UE needs to go and perform the relevant MDT tasks according to the requirements in quality information In another implementation, the quality information includes one at least of the following parameters: precision, reliability, service intention, data acquisition method.

In another implementation, upon receiving above info, RAN node may forward and configure it to UE, and UE may perform the MDT task with the requirement of quality information.

In another implementation, after performing the MDT task, the UE may report the MDT task result with the requirement of quality information.

In another implementation, the quality information comprises precision information. In one implementation, the precision information indicating quality requirement, and is used for the UE to measure during the MDT task or to report when transmitting the MDT task result. In another implementation, the precision information may comprise at least one of a measure precision or a report precision.

In another implementation, upon receiving the precision information, the UE determines at least one of a measurement method, or a report method based on the precision information. In another implementation, upon receiving the measure precision in the precision information, the UE determines a measurement method according to the measure precision. For example but not limited to, when a different measure precision is indicated, one or more different measure method may be available to achieve the indicated measure precision.

For example, when a specific precision position is indicated, the UE may determine one of one or more suitable measure method to achieve the indicated position precision. The position precision may include a global absolute position of the UE, which may be represented by the value of at least one of latitude, longitude, and elevation. There are more than one method to measure the position of the UE. The common positioning methods may include signal strength method, time of arrival and time difference method, time difference positioning method and angle of arrival location method. Moreover, there may be other positioning methods including single TP positioning, multi base station positioning, fingerprint database positioning and other methods. In addition to these positioning methods being implemented, any combination of more than one above methods may be implemented.

In another implementation, the precision information comprises at least one of a position precision, a signal strength precision, a receiving power precision, or a transmission rate precision.

In another implementation, the UE performs measurement of the MDT task according to the precision information, and/or the UE reports the MDT measurement result according to the report precision information. In another implementation, the UE performs measurement of the MDT task according to the measure precision; the UE performs measurement of the MDT task according to the report precision; or the UE reports the MDT measurement result according to the report precision.

In another implementation, the measure precision may include a required level of quality for taking a measurement during the performance of an MDT task; and/or the report precision may include a required level of precision for the measurement result reported by the UE to RAN or CN.

In another implementation, the measure precision and/or the report precision may include precision information for one or more types, for example but not limited to, position, signal strength, signal power level, data transmission rate, and any other physical quantities.

In another implementation, a precision may refer to a difference or how close a measured value relative to its true/real value.

In another implementation, the position precision refers to the error difference from the real position, such as in centimeter level, in decimeter level, in meter level, or in other specified spatial accuracy; the signal strength precision refers to the error difference from the real signal strength value, such as 1 decibel(dB), 10 dB, etc.; the receiving power precision refers to the error difference from the real receiving power value, such as in 1 Watt level, in 1 microWatt level, in 100 nanoWatt level, etc.; the transmission rate precision refers to the error difference from the real data rate, such as in 1 Megabits per second (Mbps) level, in 1 kilobits per second (kbps) level, or in 1 bit per second (bps) level.

In another implementation, the quality information comprises reliability information; and the reliability information indicates a level of reliability of more than one levels of reliability of MDT result.

In another implementation, the reliability information indicates at least one of a repetition number being N or a bearer connection number being M, wherein N and M are non-zero integers to send MDT report.

In another implementation, the more than one levels of reliability may include two levels, for example, low and high levels. When the reliability information indicates the low level, the M and/or N may be 1. When the reliability information indicates the high level, the M and/or N may be more than 1.

In another implementation, the more than one levels of reliability may include three levels, for example, low, middle, and high levels. When the reliability information indicates the low level, the M and/or N may be 1. When the reliability information indicates the middle level, the M and/or N may be more than 1, for example, 2. When the reliability information indicates the high level, the M and/or N may be larger than the M and/or N for the middle level, for example, 3.

In another implementation, the more than one levels of reliability comprises a high level of reliability and a low level of reliability.

In another implementation, in response to receiving the reliability information, the UE determines a method of reporting the MDT measurement result corresponding to the reliability information. Further, the UE determines the repetition number or a bearer connection number to send the MDT report In another implementation, in response to receiving the reliability information, the UE may determine, by itself based on the reliability information, a method of reporting the MDT measurement result corresponding to the reliability information.

In another implementation, the repetition number being N indicates to report the MDT measurement result N times;

and the UE repeats reporting the MDT measurement result according to the repetition number.

In another implementation, the bearer connection number being M indicates a maximum number of bearers being M; and the UE reports the MDT measurement result according to the bearer connection number.

In another implementation, the quality information comprises intention information; and the intention information comprises at least one of the following: a desired measurement goal, a desired measurement demand, a service intention, or a service demand.

In another implementation, the intention information may not limited to an MDT task configuration, and the UE may determine, by itself based on the intention information, a particular MDT task to perform, so as to better serve the MDT intention from the RAN/CN.

In another implementation, the intention information indicates an intention of the CN or the OAM for the UE to perform.

In another implementation, in response to receiving the intention information, the UE determines at least one MDT task corresponding to the intention information.

In another implementation, the quality information comprises data-processing information; and the data-processing information comprises at least one of parameters for data processing, data encryption, data compression, or data statistics.

In another implementation, the UE processes the MDT measurement result according to the data-processing information; and the UE reports the processed MDT measurement result.

Figure 7:
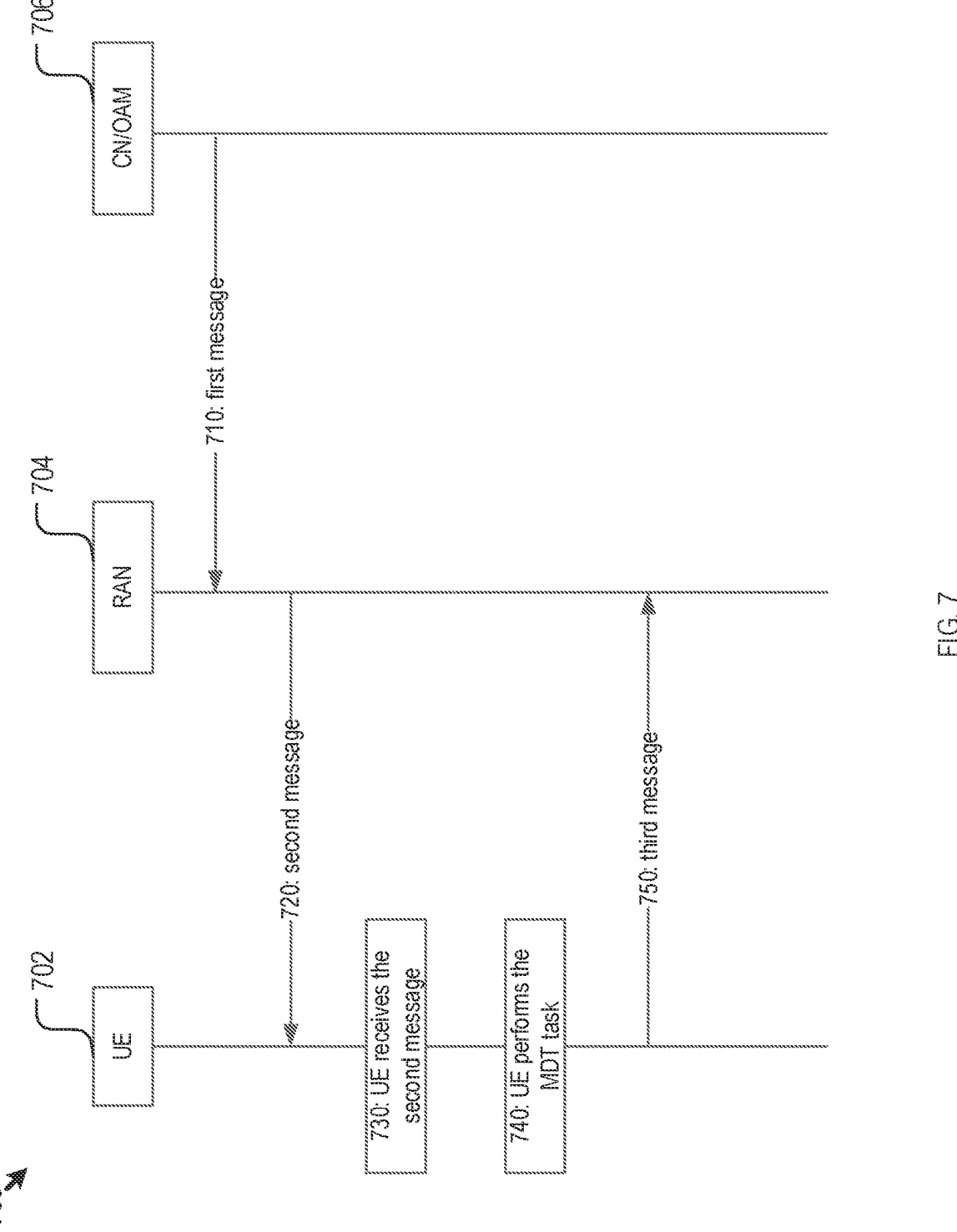
FIG. 7 shows an exemplary logic flow of a method for wireless communication.

For one example of various embodiments, as shown in FIG. 7, in a method 700, a UE (702) may be volunteering to perform one or more MDT task, and is communicating with a NW, which including a RAN 704 or a CN/OAM 706, in RRC_Connected state. The NW may expect the UE to perform an MDT task of measuring a UE position with a certain precision requirement. The UE may select one of various different positioning methods to perform the MDT task according to the position precision requirement.

An exemplary procedure for configuring a user equipment (UE) with quality indication for minimization of drive test (MDT) is described below. The procedure in various embodiments may include a portion or all the following steps, wherein the steps may be performed in the order described below or in a different order.

Step 710: A 5GC, including CN/OAM, may send a first message, for example, NGAP:TRACE START message, to the RAN node serving the UE at the moment. The first message may include the MDT configuration information for the MDT task of measuring a UE position to the UE. Besides the normal MDT configuration information, the first message may contain one or more new information element (IE). For the UE, the first message contains a new IE "measure quality information"=1 and a new IE "measure position precision"=10 meter (m) for the MDT configuration of task. In some implementations, in addition, the 5GC may send the NAS info in TRACE START message to the UE, indicating the UE to use the precision requirement.

Step 720: Upon receiving the NGAP:TRACE START message, the RAN node compiles and sends the relevant MDT configuration information and NAS info to the UE via a second message, for example, RRC RECONFIGURA-TION message.

Step 730: Upon receiving the RRC RECONFIGURA-TION message, the UE obtains the MDT configuration information and the NAS info, so that the UE understands that the NW expects to perform the specific MDT tasks for measuring the UE position and positioning with a position precision of 10 m.

Step 740: The UE may select a positioning method, which has a capability of obtaining 10 m precision and start performing the expected MDT tasks for measuring position as configured by the NW.

Step 750: The UE may report the corresponding MDT measurement results (or MDT logs) when available via a third message with one of legacy procedures to the NW, which includes an MDT positioning measurement result in 10 m precision.

For another example of various embodiments, another UE, for example, UE2, is voluntering to perform one or more MDT task, and is communicating with a NW in RRC_Connected state. The NW expects the UE2 to perform an MDT task of measuring peak data rate with file downloading with certain precision requirement. The UE2 may report the valid value of peak data rate in Mbps, kbps, or bps to reduce unnecessary data. Whether a data rate is in Mbps, kbps or bps, it occupy the same bit numbers in an MDT report. In one example, when a data rate is 5 Mbps, a value of 5 may be included in the MDT report. In another example, when a data rate is 40 kbps, a value of 40 may be included in the MDT report.

An exemplary procedure for configuring a user equipment (UE) with quality indication for minimization of drive test (MDT) is described below. The procedure in various embodiments may include a portion or all the following steps, wherein the steps may be performed in the order described below or in a different order.

Step 21: A 5GC may send NGAP:TRACE START message to the RAN node serving the UE2 at the moment, including the MDT configuration information for the MDT task of measuring a peak data rate with a file downloading. In high signal to noise ratio (SNR) scenario, file downloading traffic usually has a high data rate, and Mbps is more suitable as the measurement unit. Besides of the normal MDT configuration information, the NGAP:TRACE START message may contain one or more new IE. For UE2, it contains a new IE "measure quality information"=1 and a new IE "data rate precision"=Mbps for an MDT configuration of task. In another implementation, in addition, the 5GC sends the NAS info in TRACE START message to the UE2, indicating UE2 to use the precision requirement.

Step 22: Upon receiving the NGAP:TRACE START message, the RAN node compiles and sends the relevant MDT configuration information and NAS info to UE2 via RRC RECONFIGURATION message respectively.

Step 23: Upon receiving the RRC RECONFIGURATION message, the UE2 obtains the MDT configuration information and the NAS info, knowing that the NW expects to perform the specific MDT tasks for measuring peak data rate with file downloading.

Step 24: The UE2 starts performing the expected MDT tasks for measuring peak data rate with file downloading as configured by NW and get the peak data rate value in Mbps.

Step 25: The UE2 may report the corresponding MDT measurement results (or MDT logs) when available via legacy procedures to the NW, which includes the MDT peak data rate in Mbps.

For another example of various embodiments, another UE, for example, UE3, is voluntering to perform one or more MDT task, and is communicating with a NW in RRC_Connected state. The NW expects UE3 to perform an MDT task with a certain reliability requirement. For example, the MDT configuration message contains a new IE "measure quality information"=1 and a new IE "reliability"=High for MDT configuration of task. After the UE3 receives the message and performs the MDT task, it may report the MDT result with repeating, or with dual connection (DC) to improve the reliability. It is useful in time sensitive network. In some implementation, in addition, the new MDT configuration information is also in terms of the number of repetitions, the number of connection as reliability indication in one or more new IE.

For another example of various embodiments, another UE, for example, UE4, is voluntering to perform MDT tasks, and is communicating with a NW in RRC_Connected state. The NW expects the UE4 to know the MDT task intention for performing an MDT task better. For example, the MDT task intention is for measuring mobility for analyzing handover performance in high-speed scenario. The NW configuration message contains the neighbor cell list for measurement. The UE4's route line may contain cells that are not in the MDT configuration cell list.

After the UE4 receives the message and knows the MDT task intention, it may choose and measure the suitable cells according to the configuration message and its route planning for the MDT task. The change of MDT configuration is not timely in high-speed scenario, but the UE4 may modify the measurement area in time after knowing the intention. It is beneficial to pass the test intent to the task performer.

For another example of various embodiments, another UE, for example, UE5, is voluntering to perform MDT tasks, and is communicating with a NW in RRC_Connected state. The NW configuration message contains data process information for better report. For example, in the case of resource shortage, the NW may still expect UE5 report MDT result in time, therefore data compression indication may be in MDT configuration message. After the UE5 receives the message and performs the MDT task, it may compress the MDT results to report.

The present disclosure describes methods, apparatus, and computer-readable medium for wireless communication. The present disclosure addressed the issues with configuring a user equipment (UE) with quality indication for minimization of drive test (MDT). The methods, devices, and computer-readable medium described in the present disclosure may facilitate the performance of wireless communication by configuring a UE with quality indication for MDT, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:

sending, by a radio access network (RAN) node, a configuration message to a user equipment (UE), the configuration message comprising quality information to configure the UE to perform a minimization of drive test (MDT) task, wherein the UE reports at least one MDT measurement result to the RAN node according to the quality information, and wherein the quality information comprises at least one of precision information, reliability information, intention information, or data-processing information; and receiving, by the RAN node, the at least one MDT measurement result from the UE.

2. The method according to claim 1, wherein the quality information comprises at least two of precision information, reliability information, intention information, or data-processing information.

3. The method according to claim 1, wherein the RAN node compiles and sends a radio resource control (RRC) message to the UE, and wherein the RRC message comprises the configuration message for the UE.

4. The method according to claim 1, wherein upon receiving the precision information, the UE determines at least one of a measurement method, or a report method.

5. The method according to claim 1, wherein the precision information comprises at least one of a position precision, a signal strength precision, a receiving power precision, or a transmission rate precision.

6. The method according to claim 1, wherein:

the UE performs the MDT task according to the precision information; or the UE reports the MDT measurement result according to the precision information.

7. The method according to claim 1, wherein the reliability information indicates a level of reliability of more than one levels of reliability of MDT task result.

8. The method according to claim 1, wherein the intention information comprises at least one of a desired measurement goal, a desired measurement demand, a service intention, or a service demand.

9. The method according to claim 1, wherein the data-processing information comprises at least one of parameters for data processing, data encryption, data compression, or data statistics.

10. A method for wireless communication, comprising:

receiving, by a user equipment (UE), a configuration message from a radio access network (RAN) node, the configuration message comprising quality information, wherein the quality information comprises at least one of precision information, reliability information, intention information, or data-processing information; and performing, by the UE, a minimization of drive test (MDT) task and reporting at least one MDT measurement result according to the quality information.

11. The method according to claim 10, wherein the quality information comprises at least two of precision information, reliability information, intention information, or data-processing information.

12. The method according to claim 10, wherein upon receiving the precision information, the UE determines at least one of a measurement method, or a report method.

13. The method according to claim 10, wherein the precision information comprises at least one of a position precision, a signal strength precision, a receiving power precision, or a transmission rate precision.

14. The method according to claim 10, wherein:

the UE performs the MDT task according to the precision information; or the UE reports the MDT measurement result according to the precision information.

15. The method according to claim 10, wherein the RAN node is configured to compile and send a radio resource control (RRC) message to the UE, and wherein the RRC message comprises the configuration message for the UE.

16. The method according to claim 10, wherein the reliability information indicates a level of reliability of more than one levels of reliability of MDT task result.

17. The method according to claim 10, wherein the intention information comprises at least one of a desired measurement goal, a desired measurement demand, a service intention, or a service demand.

18. The method according to claim 10, wherein the data-processing information comprises at least one of parameters for data processing, data encryption, data compression, or data statistics.

19. An apparatus comprising:

a memory storing instructions; and a processor in communication with the memory, wherein, when the processor executes the instructions, the processor is configured to cause the apparatus to perform:

sending a configuration message to a user equipment (UE), the configuration message comprising the quality information to configure the UE to performs a minimization of drive test (MDT) task, wherein the UE reports at least one MDT measurement result according to the quality information, and wherein the quality information comprises at least one of precision information, reliability information, intention information, or data-processing information; and receiving the at least one MDT measurement result from the UE.

20. An apparatus comprising:

a memory storing instructions; and a processor in communication with the memory, wherein, when the processor executes the instructions, the processor is configured to cause the apparatus to perform:

receiving a configuration message from a radio access network (RAN) node, the configuration message comprising quality information, wherein the quality information comprises at least one of precision information, reliability information, intention information, or data-processing information; and performing a MDT) task and reporting at least one MDT measurement result according to the quality information.

* * * * *